United States Patent [19]
Monroe et al.

[11] Patent Number: 5,879,558
[45] Date of Patent: *Mar. 9, 1999

[54] WATER CONSERVING REVERSE OSMOSIS UNIT AND METHOD OF OPERATING IT

[75] Inventors: Jerry B. Monroe, Peoria; John K. Hemingway, Phoenix, both of Ariz.

[73] Assignee: Premier Manufactured Systems, Inc., Phoenix, Ariz.

[ * ] Notice: The term of this patent shall not extend beyond the expiration date of Pat. No. 5,639,374.

[21] Appl. No.: 874,829

[22] Filed: Jun. 13, 1997

Related U.S. Application Data

[63] Continuation of Ser. No. 156,861, Nov. 19, 1993, Pat. No. 5,639,374, which is a continuation of Ser. No. 906,666, Jun. 30, 1992, abandoned.

[51] Int. Cl.⁶ .......................... B01D 61/12; B01D 61/10
[52] U.S. Cl. .......................... 210/637; 210/86; 210/136; 210/195.2; 210/652; 210/805
[58] Field of Search .............................. 210/86, 90, 104, 210/110, 116, 136, 137, 194, 195, 257.2, 258, 321.6, 416.1, 416.3, 637, 638, 652, 741, 805

[56] References Cited

U.S. PATENT DOCUMENTS

| | | | |
|---|---|---|---|
| 3,630,378 | 12/1971 | Bauman | 210/257.2 |
| 3,726,793 | 4/1973 | Bray | 210/321.6 |
| 3,746,640 | 7/1973 | Bray | 210/652 |
| 3,786,924 | 1/1974 | Huffman | 210/258 |
| 4,156,621 | 5/1979 | Andrews et al. | 134/10 |
| 4,321,137 | 3/1982 | Kohler | 210/137 |
| 4,332,685 | 6/1982 | Nowlin et al. | 210/638 |
| 4,344,826 | 8/1982 | Smith | 203/2 |
| 4,610,605 | 9/1986 | Hartley | 417/269 |
| 4,626,346 | 12/1986 | Hall | 210/110 |
| 4,702,842 | 10/1987 | Lapierre | 210/651 |
| 4,812,237 | 3/1989 | Cawley et al. | 210/605 |
| 5,066,234 | 11/1991 | Menon et al. | 210/136 |
| 5,122,265 | 6/1992 | Mora et al. | 210/257.2 |
| 5,203,803 | 4/1993 | Schoenmeyr | 210/416.3 |
| 5,282,972 | 2/1994 | Hanna et al. | 210/257.2 |
| 5,639,374 | 6/1997 | Monroe et al. | 210/257.2 |

*Primary Examiner*—Joseph W. Drodge
*Attorney, Agent, or Firm*—William C. Fuess

[57] ABSTRACT

A reverse osmosis water purification system in which the concentrate water which is normally produced by the process is not disposed of by routing it to a drain line or otherwise, but is redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensor for increasing the pressure of the incoming non-processed water to the reverse osmosis unit, means for directing the concentrate water from the reverse osmosis unit to the incoming main water supply (cold), or to a hot water line. Additionally included is a one-way check valve in the concentrate water line, and a sensor sensing the pressure of water in the storage tank and turn the pump off whenever the pressure exceeds a predetermined value.

21 Claims, 1 Drawing Sheet

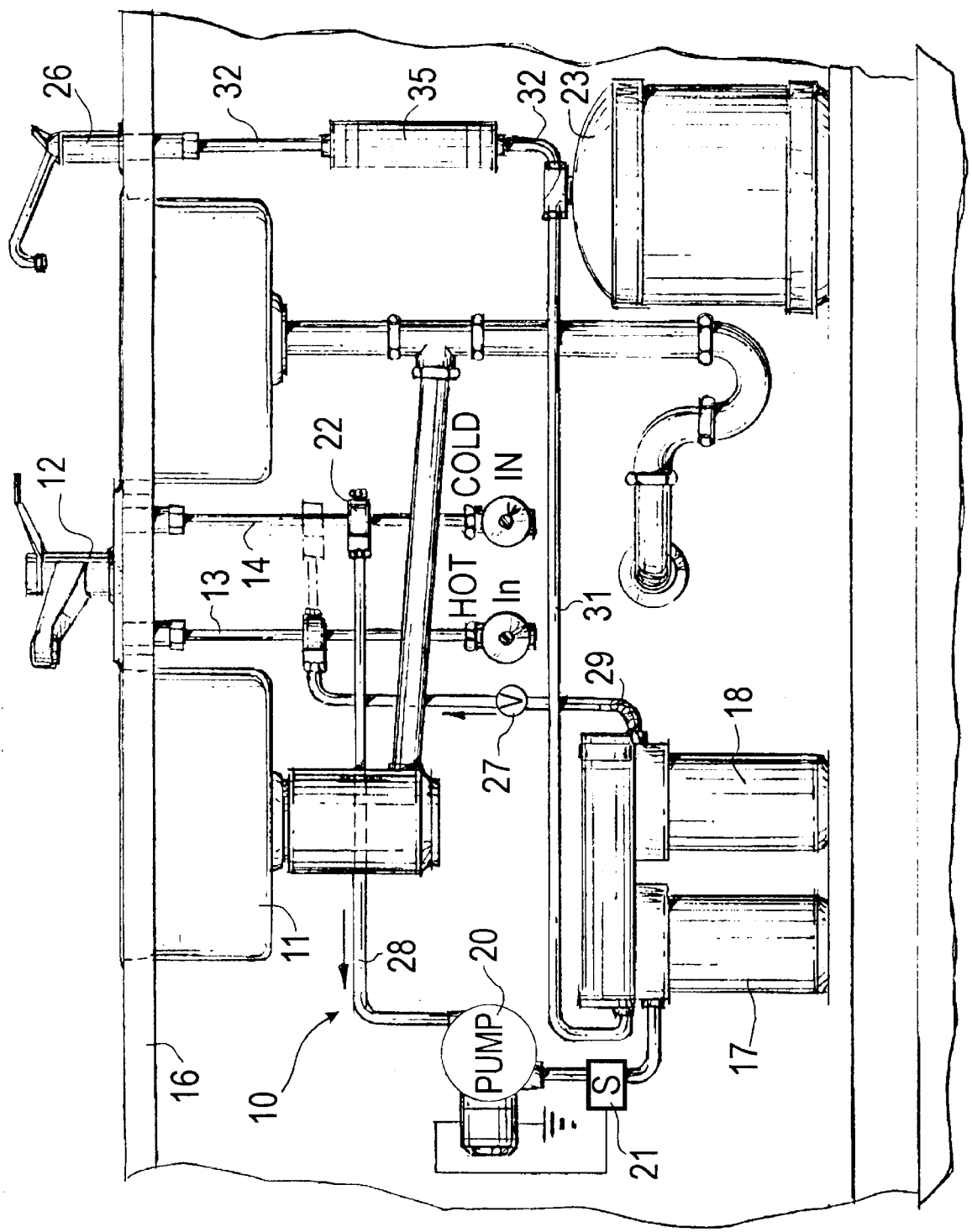

WATER CONSERVING REVERSE OSMOSIS UNIT AND METHOD OF OPERATING IT

The present patent application is a continuation of U.S. patent application Ser. No. 08/156,861, filed on Nov. 19, 1993, issued Jun. 17, 1997, as U.S. Pat. No. 5,639,374; which application is itself a continuation of U.S. patent application Ser. No. 07/906,666, filed on Jun. 30, 1992, abandoned.

FIELD OF THE INVENTION

This invention relates to water purification equipment and more particularly to a reverse osmosis water purification system whereby the considerable amount of waste water which is normally produced by the reverse osmosis process can be saved and reused.

BACKGROUND OF THE INVENTION

The purification of water by reverse osmosis is a well known technology which is being used considerably more today than it was in the past due to increasing drinking water problems resulting from pollution, and the like. The increasing usage of this old technology has resulted in the development and refinement of systems which are economically and technically feasible for use in both domestic and industrial applications.

A typical reverse osmosis water purification and storage system currently used for home application employs a special diaphragm-type hydro-pneumatic storage tank into which the purified water from a reverse osmosis unit is stored. The special tank is provided with a diaphragm to divide it into a water storage compartment and a pre-pressurized air compartment. Pure water from the reverse osmosis unit is directed into the water storage compartment and, by diaphragm action, will compress the air in the pre-pressurized air compartment. When a demand for pure water occurs, the compressed air in the air compartment exerts a force on the diaphragm causing the water in the storage compartment of the tank to flow under the influence of that force through a plumbing line to an open fixture, usually a faucet. Systems are also available which employ a tank which stores the purified water at atmospheric pressure. A pump is included in the system to deliver water from the storage tank to the faucet.

When water is being purified by reverse osmosis, it will, in addition to producing purified water, produce a considerable amount of waste water as is well known. This production of waste water, which is a by-product of the reverse osmosis process, and which is also called concentrate water or reject water, has caused concern over the use of the reverse osmosis water purification technology wherever the supply of water to be purified is limited for whatever reason. For example, the ratio of concentrate or reject water to purified water can range from about 3:1 to about 15:1 depending on the particular system. This means that for every gallon of purified water produced, from 3 to 15 gallons is considered as concentrate water and customarily sent to a drain. This waste of water is of great concern particularly in drought areas of the world where water is a particularly precious commodity.

In Hall, U.S. Pat. No. 4,626,346, there is disclosed a reverse osmosis water purification system useful in limited water supply installations such as is found in recreational vehicles, boats and the like which use an unpressurized supply tank for the water source. According to the Hall patent, waste water from the reverse osmosis unit is recycled back to the supply tank to conserve water.

SUMMARY OF THE INVENTION

This invention provides a reverse osmosis water purification system whereby the considerable amount of reject or concentrate water which is normally produced by the process is not disposed of by routing it to a drain line or otherwise, but is redirected to the main water supply. More particularly, the reverse osmosis system of this invention is designed to be plumbed into an existing pressurized water supply such as from a municipal water system or from a well and to route the concentrate water from the process back to the pressurized water supply line.

The system includes the well-known components of a reverse osmosis membrane, pre-filters which are installed ahead of the reverse osmosis membrane, and an appropriate tank to store the purified water. In addition, the system includes a pump means and associated pressure sensing means for increasing the pressure of the incoming non-processed water to the reverse osmosis unit, means for directing the concentrate water from the reverse osmosis unit to the incoming main water supply (cold), or to a hot water line, the means for directing the concentrate water also including a one-way check valve, and means to sense the pressure of water in the storage tank to sense the pressure in the tank and turn the pump off whenever the pressure exceeds a predetermined value.

BRIEF DESCRIPTION OF THE DRAWINGS

FIG. 1 is a side elevational view of a typical installation of the reverse osmosis water purification system of this invention.

DESCRIPTION OF THE PREFERRED EMBODIMENT

Referring to FIG. 1, a reverse osmosis water purification system installed under a sink is shown. The system designated generally by the reference numeral 10 is shown in a typical installation, that is in a kitchen and under the sink where both cold and hot water supply lines are available. As shown, there are a pair of sinks 11 mounted in the counter top 16. Faucet 12 is supplied by cold water line 14 and hot water line 13. Attached to cold water line 14 is a saddle valve 22 which permits pressurized water from line 14 to be diverted through pipe 28, to pump 20 and ultimately to the reverse osmosis unit 19. The water in pipe 28 is under pressure as supplied by the municipality or well pump, customarily from about 30 to about 90 PSI. Prior to entering the reverse osmosis unit 19, the water is passed through preliminary filters 17 and 18 to remove relatively large foreign particles as is well known in the art. After passing through the preliminary filters the water is passed to the reverse osmosis unit 19 by means of piping which is not shown. As is well known, reverse osmosis unit 19 contains a membrane (not shown) which purifies water by the reverse osmosis process and has concentrate water as a by-product. The unit is also provided with pipe 29 which carries such concentrate water to either the hot water line 13 or the cold water line 14. Mounted in concentrate water pipe 29 is a one way check valve 27 which prevents the pressurized hot or cold water from back flowing to the reverse osmosis unit. The reverse osmosis unit is also provided with pipe line 31 which carries the purified water to the storage tank 23. Although not shown, storage tank 23 includes an elastomeric diaphragm which separates the interior of the tank into a water storage compartment and an air compartment which surrounds the water storage compartment. The air compartment is provided with pressurized air and this pressurized air serves to force water from tank 23 into pipe 32, through a final filter 25, usually activated carbon, and finally to faucet 26. It will also be understood that where a tank is used which stores the purified water at atmospheric pressure, then a pump is used to deliver water from the tank into pipe 32, through a final filter 25 and then to faucet 26. Such storage tanks are available from numerous sources. A typical tank for residential use has a water capacity of about 3 gallons and is pressurized at about 5–7 PSI. There are other types of storage tanks depending upon the application.

In order for a reverse osmosis system to function properly, there must be a differential pressure across the membrane of the unit. This is usually accomplished by the normal pressure of water from a municipal water supply or well in combination with a flow restricting device installed in the concentrate water line. This combination creates the necessary differential pressure across the membrane.

It is feature of this invention that such flow restricting device can be eliminated from the system of this invention where the pressure of the water from the municipal water supply is at least about 30 PSI. Where the supply line pressure is less than about 30 PSI, then a flow restricting device is recommended to insure that proper differential pressure across the membrane is maintained. The necessary pressure differential across the reverse osmosis membrane is created by increasing the pressure of the incoming water to the reverse osmosis unit, allowing such water to be processed in the unit, and thereafter returning the concentrate water from the unit back to the main water supply, which of course is under pressure. In fact, use of a separate flow restricting device in the system of this invention at incoming water pressure over 40 PSI will render the system inoperative.

Thus it is a feature of the system of this invention that the concentrate water from the reverse osmosis unit be returned to the main water supply lines 13 or 14. To obtain proper water purification, the water to be purified must be obtained from the so-called "cold" water line 14. However, the concentrate water may be returned to either the cold water line 14 or the hot water line 13. It is also necessary that the pressure of the concentrate water in pipe or line 29 be greater than the water pressure in the cold or hot water lines 14 and 13. If the pressure in concentrate water were not greater, it would not be possible to inject the concentrate water in a supply line, such as hot water line 13 as shown in FIG. 1.

To accomplish this pressure increase, pump 20 is installed in line 28 along with a pressure sensing switch 21. The pressure sensing switch can be adjusted to varying pressures and functions to operate the pump when necessary to obtain optimal pressure increase. The amount of the pressure increase over the pressure normally present in the supply line is subject to several factors, including the normal supply line water pressure and the optimum water pressure for operation of the reverse osmosis unit 19. If the supply line pressure is within the range of the water pressure necessary to effectively operate the reverse osmosis unit, then the increase in pressure need be only enough to insure that the concentrate water is able to be injected back into the main supply line (cold) or the hot water line. Usually an increase of about 1–3 PSI is sufficient. However, where supply line pressure is considerably lower than that necessary to effectively operate the reverse osmosis unit, then the pressure should be increased to that required to effectively operate the reverse osmosis unit.

In order to prevent the possibility of concentrate water or unprocessed water from either of lines 13 or 14 from returning to the reverse osmosis unit 19 via line 29, a one way check valve 27 must be installed in concentrate water pipe 29. Additionally, when tank 23 is sufficiently charged with purified water an automatic shut off valve is employed to stop the flow of incoming purified water from the RO unit along with the sensing switch 21 which activates to shut off pump 20. Although not shown, if a hydro-pneumatic tank is used, a one-way check valve should also be installed in line 31.

From the foregoing it is apparent that the water purification system of this invention provides purified water which at the same time conserves the concentrate water by returning it to the main water supply, be it hot or cold. Returning the so-called "concentrate water" to the main water supply is a practical solution to the problem of high water useage. The concentrate water is mixed in and diluted with the incoming water and will be used for many other purposes such as hand washing, dishwashing, and the like.

We claim:

1. A water-conserving reverse osmosis water purification system comprising:

(a) a water source for providing a flow of water between a first, upstream, location and a second, downstream, location with such little flow restriction between locations that both locations are essentially under a same first pressure, at least about 30 PSI, that is of a magnitude suitable to appear as a differential pressure across a reverse osmosis unit;

(b) a reverse osmosis unit receiving non-processed water for producing, in response to a differential pressure between its input and its output, purified water and concentrate water therefrom;

(c) a non-processed water pipe means for conveying water from the first, upstream, location of said water source to said reverse osmosis unit as said non-processed water;

(d) a pump means located within said non-processed water pipe means for increasing the first pressure of said non-processed water by a second pressure of a magnitude that is suitable to appear as the differential pressure across the reverse osmosis unit, the first and second pressures together jointly being, however, of a combined magnitude that is unsuitably large so as to appear as the differential pressure across the reverse osmosis unit;

(e) a concentrate water pipe means for conveying concentrate water from said reverse osmosis unit to the second, downstream, location of said water source that is essentially at said first pressure, said concentrate water pipe means including (e1) a check valve means for preventing water from said water source from flowing to said reverse osmosis unit; but (e2) without any substantial pressure drop or flow restriction whatsoever to the flow of concentrate water from the reverse osmosis unit to the water source, including in the check valve means which produces neither any substantial flow restriction nor any substantial pressure drop to the flow of concentrate water in this direction;

(f) a purified water storage tank; and (g) a purified water pipe means conveying purified water from said reverse osmosis unit to said storage tank;

(h) wherein said system has no device in said pipe means for restricting the flow of concentrate water from the reverse osmosis unit to the water source; and wherein the differential pressure appearing across the reverse osmosis unit is thus the difference between, on the one hand, the first and second pressures jointly, and, on the other hand, the first pressure, or a differential pressure that is equal to the second pressure which is of the magnitude that is suitable so as to appear as the differential pressure across the reverse osmosis unit.

2. The system of claim 1 wherein said source of water includes a source of both unheated and heated water under substantially the same pressure and wherein the water processed by said reverse osmosis unit is obtained from said unheated source and returned to said heated source or unheated source.

3. The system of claim 2 wherein said system includes means for sensing the amount of water in said storage tank to shut off said pump means when said tank is sufficiently charged with purified water.

4. The system of claim 1 wherein said water source comprises:
a source of unheated water; and
a source of heated water;
wherein heated water from said heated water source and unheated water from said unheated water source are under substantially the same pressure;
wherein said nonprocessed water pipe means conveys to said reverse osmosis unit unheated water obtained from said unheated water source; and
wherein said concentrate water pipe means is conveying concentrate water to either said unheated water source or said heated water source.

5. The system of claim 4 wherein said concentrate water pipe means conveys concentrate water to said heated water source.

6. The system of claim 4 further comprising:
sensor means for sensing the amount of purified water in said storage tank; and
control means responsive to said sensor means for shutting off said pump means when said storage tank contains a predetermined amount of purified water.

7. A water purification system comprising:
a water supply for providing a flow of water between a first, upstream, location and a second, downstream, location at a greater-than-atmospheric supply pressure with such little restriction between locations that both locations are essentially at the same pressure;
a pump means, receiving water at the supply pressure from the first, upstream, location of the water supply, for boosting the pressure of the received water above the supply pressure to which it is already pressurized by an amount equal to the sum of (i) a relatively larger, first, pressure that is of a magnitude that is individually sufficiently large so as to appropriately serve as a differential pressure between an inlet and any outlet of a reverse osmosis unit, plus (ii) a relatively smaller, second, pressure that is of a magnitude that is individually sufficiently large so as to appropriately serve as the differential pressure causative of a flow of fluid within a conduit while simultaneously being individually too small so as to appropriately serve as the differential pressure of a reverse osmosis unit, wherein the sum of the first pressure and the second pressure is of a joint magnitude that is too large so as to appropriately serve as the differential pressure across a reverse osmosis unit;
a reverse osmosis unit, receiving at its inlet water at the boosted supply pressure from the pump means, for processing by reverse osmosis the received water while incurring a pressure drop equal to the first pressure so as to produce from the received water both (i) purified water at a one, first, outlet and (ii) waste water at another, second, outlet;
wherein the waste water at the second outlet of the reverse osmosis unit, in particular, is, despite incurring the pressure drop equal to the first pressure between the inlet and the outlets of the reverse osmosis unit, still at a second outlet pressure that equals the sum of the supply pressure plus second pressure, and which second outlet pressure is thus greater than the supply pressure; and
a conduit means for conveying the waste water at the second outlet pressure from the second outlet of the reverse osmosis unit to the second, downstream, location of the water supply without any substantial restriction, therein making that this flow will transpire in response to a pressure differential that is equal to the relatively smaller second pressure between the second outlet of the reverse osmosis unit and the water supply;
wherein the differential water pressure across the reverse osmosis unit between its inlet and its second outlet equals the first pressure, and is thus of a magnitude appropriate to serve as the pressure across a reverse osmosis unit;
wherein the waste water that is produced by the reverse osmosis unit is returned to the water supply under the differential pressure that is equal to the second pressure despite the fact that the water supply is at a greater-than-atmospheric pressure;
wherein water is conserved.

8. The water purification system according to claim 7 further comprising:
a check valve, located in the conduit means, for preventing any flow of water from the water supply to the second outlet of the reverse osmosis unit in the abnormal event that the boosted supply pressure should temporarily drop below the supply pressure.

9. The water purification system according to claim 7 wherein the water supply is providing water at a greater-than-atmospheric supply pressure in the range of 10 to 150 PSI.

10. The water purification system according to claim 7 wherein the pump means is boosting the pressure of the received water by a pressure in the range of 40 to 90 PSI.

11. The water purification system according to claim 10 wherein the pump means boosting the pressure of the received water by a pressure in the range of 40 to 90 PSI is so boosting the pressure as the sum of (i) a first pressure, appropriate to serve as a differential pressure between an inlet and any outlet of a reverse osmosis unit, in the range of 39 to 89 PSI, plus (ii) a second pressure, suitable to serve as a differential pressure causative of a flow of fluid within a conduit, in the range of 1 to 10 PSI;
wherein the from 40 to 90 PSI by which the boosted supply pressure is greater than the supply pressure is appropriate to serve as both (i) the differential pressure across the reverse osmosis unit plus (ii) the differential pressure by which waste water produced by the reverse osmosis unit is returned to the water supply through the conduit means.

12. The water purification system according to claim 7 wherein the water supply comprises:

a hot water supply for providing heated water at the greater-than-atmospheric supply pressure; and a cold water supply for providing unheated water at the greater-than-atmospheric supply pressure;

and wherein the pump means is receiving water at the supply pressure from the cold water supply:

the reverse osmosis unit is receiving at its inlet unheated water at the boosted supply pressure from the pump means; and the conduit means is conveying the waste water at the second outlet pressure from the second outlet of the reverse osmosis unit to the cold water supply in response to the pressure differential that is equal to the second pressure.

13. The water purification system according to claim 7 wherein the water supply comprises:

a hot water supply for providing heated water at the greater-than-atmospheric supply pressure; and a cold water supply for providing unheated water at the greater-than-atmospheric supply pressure;

and wherein the pump means is receiving water at the supply pressure from the cold water supply:

the reverse osmosis unit is receiving at its inlet unheated water at the boosted supply pressure from the pump means; and the conduit means is conveying the waste water at the second outlet pressure from the second outlet of the reverse osmosis unit to the cold water supply in response to the pressure differential that is equal to the second pressure.

14. A water purification system comprising:

a water supply for providing water at a greater-than-atmospheric supply pressure;

a pump means, receiving water at the supply pressure from the water supply, for boosting the pressure of the received water above the supply pressure to which it is already pressurized by an amount equal to the sum of (i) a relatively larger, first, pressure that is of a magnitude that is individually sufficiently large so as to appropriately serve as a differential pressure between an inlet and any outlet of a reverse osmosis unit, plus (ii) a relatively smaller, second, pressure that is of a magnitude that is individually sufficiently large so as to appropriately serve as the differential pressure causative of a flow of fluid within a conduit while simultaneously being individually too small so as to appropriately serve as the differential pressure of a reverse osmosis unit, wherein the sum of the first pressure and the second pressure is of a joint magnitude that is too large so as to appropriately serve as the differential pressure across a reverse osmosis unit;

a sensor of the supply pressure;

means for controlling the pump means so that it substantially continuously boosts the supply pressure by the sum of the first pressure and the second pressure despite any occurrence of variations in the supply pressure;

a reverse osmosis unit, receiving at its inlet water at the boosted supply pressure from the pump means, for processing by reverse osmosis the received water while incurring a pressure drop equal to the first pressure so as to produce from the received water both (i) purified water at a one, first, outlet and (ii) waste water at another, second, outlet;

wherein the waste water at the second outlet of the reverse osmosis unit, in particular, is, despite incurring the pressure drop equal to the first pressure between the inlet and the outlets of the reverse osmosis unit, still at a second outlet pressure that equals the sum of the supply pressure plus second pressure, and which second outlet pressure is thus treater than the supply pressure; and a conduit means for conveying the waste water at the second outlet pressure from the second outlet of the reverse osmosis unit to the water supply without any substantial restriction, therein making that this flow will transpire in response to a pressure differential that is equal to the relatively smaller second pressure between the second outlet of the reverse osmosis unit and the water supply;

wherein the differential water pressure across the reverse osmosis unit between its inlet and its second outlet equals the first pressure, and is thus of a magnitude appropriate to serve as the pressure across a reverse osmosis unit;

wherein the waste water that is produced by the reverse osmosis unit is returned to the water supply under the differential pressure that is equal to the second pressure despite the fact that the water supply is at a greater-than-atmospheric pressure;

wherein water is conserved.

15. A method of recycling waste water from a reverse osmosis unit that produces both purified water and waste water, the method comprising:

receiving into a pump supply water from an upstream location that is pressurized to a supply pressure greater than atmospheric pressure, and increasing in the pump the pressure of the received supply water by the sum of (i) a first pressure that is of a magnitude individually sufficiently large so as to appropriately serve as a differential pressure across a membrane of a reverse osmosis unit, plus (ii) a second pressure that is of magnitude individually sufficiently large so as appropriately serve to force water through a conduit, therein by the sum of the first pressure and the second pressure to produce an increased pressure that is of a magnitude too large so as to be appropriate to appear as the differential pressure across a reverse osmosis unit;

receiving in a reverse osmosis unit the supply water at the increased pressure from the pump, and processing the received water so as to produce both (i) purified water at a purified water outlet, and also (ii) waste water at a waste water outlet, while incurring a pressure drop equal to the first pressure;

wherein each of which purified water and waste water is produced at a pressure that is, although less than the increased pressure, still greater than the supply pressure by the magnitude of the second pressure; and flow-connecting without any substantial restriction the waste water at its pressure greater than the supply pressure from the reverse osmosis unit to the downstream location of the supply of water which downstream location is at substantially the supply pressure, wherein by this substantially unrestricted direct connection any reverse pressure tending to counteract flow of the waste water is precisely and exactly the normal supply pressure, is no greater nor any lessor pressure;

wherein the differential water pressure across the reverse osmosis unit is the first pressure, and is thus of an appropriate magnitude;

wherein the waste water produced by the reverse osmosis unit is directly returned without substantial restriction and under the second pressure to the supply of water that is substantially at the supply pressure that is a greater-than-atmospheric pressure, and the second pressure of this return is thus also of an appropriate magnitude; and wherein water is conserved because the waste water is returned to the supply of water.

16. The method according to claim 15 wherein the flow-connecting comprises:

checking with a check valve the flow-connecting to be unidirectional, making that there should be no flow of water from the upstream location of water to the waste water outlet of the reverse osmosis unit;

wherein any transient pressure increases in the water supply pressure as may exceed the increased pressure do not result in any flow of supply water from a source thereof to the waste water outlet of the reverse osmosis unit.

17. The method according to claim 15 wherein the receiving is of water pressurized to a supply pressure in the range of 20 to 150 PSI; and wherein the increasing of the pressure of the received supply water is to an increased pressure that is greater than the supply pressure by from 39 to 89 PSI.

18. A method of recycling waste water from a reverse osmosis unit that produces both Purified water and waste water, the method comprising:

receiving into a pump supply water that is pressurized to a supply pressure treater than atmospheric pressure, and increasing in the pump the pressure of the received supply water by the sum of (i) a first pressure that is of a magnitude individually sufficiently large so as to appropriately serve as a differential pressure across a membrane of a reverse osmosis unit, plus (ii) a second pressure that is of magnitude individually sufficiently large so as appropriately serve to force water through a conduit, therein by the sum of the first pressure and the second pressure to produce an increased pressure that is of a magnitude too large so as to be appropriate to appear as the differential pressure across a reverse osmosis unit;

receiving in a reverse osmosis unit the supply water at the increased pressure from the pump, and processing the received water so as to produce both (i) purified water at a purified water outlet, and also (ii) waste water at a waste water outlet, while incurring a pressure drop equal to the first pressure;

wherein each of which purified water and waste water is produced at a pressure that is, although less than the increased pressure, still greater than the supply pressure by the magnitude of the second pressure; and flow-connecting without any substantial restriction the waste water at its pressure greater than the supply pressure from the reverse osmosis unit to the supply of water that is at the supply pressure, wherein by this substantially unrestricted direct connection any reverse pressure tending to counteract flow of the waste water is precisely and exactly the normal supply pressure, is no greater nor any lessor pressure;

sensing the supply pressure; and regulating the increasing in accordance with the sensing;

wherein the increased pressure may be substantially continually maintained greater than the supply pressure despite variations in the supply pressure;

wherein the differential water pressure across the reverse osmosis unit is the first pressure, and is thus of an appropriate magnitude;

wherein the waste water produced by the reverse osmosis unit is directly returned without substantial restriction and under the second pressure to the supply of water that is at the supply pressure that is a greater-than-atmospheric pressure, and the second pressure of this return is thus also of an appropriate magnitude; and wherein water is conserved because the waste water is returned to the supply of water.

19. A reverse osmosis unit operative between upstream and downstream locations of a supply of pressurized water, the unit comprising:

a pump receiving pressurized water from the supply at an upstream location for increasing the pressure thereof by a first amount appropriate to appear as the differential pressure across a reverse osmosis unit plus a second amount appropriate to appear as the differential pressure across a conduit flowing fluid, the increased pressure of the supply water being inappropriately large so as to appear as the differential pressure across a reverse osmosis unit;

a filtration unit, having an inlet flow connected to the pump means for receiving water at the augmented supply pressure therefrom, for producing (i) purified water at a first outlet flow connection and (ii) waste water at a second outlet flow connection while incurring a pressure drop equal to the first pressure;

wherein both connections are at an outlet pressure that equals the augmented supply pressure minus the first pressure, which outlet pressure thus equal the second pressure; and a conduit for directly connecting the second outlet of the filtration unit to the supply of pressurized water at the downstream location without any substantial flow restriction;

wherein the differential water pressure across the filtration unit is the difference between the augmented supply pressure and the outlet pressure, and is thus equal to the first pressure, and is thus appropriate;

wherein the differential water pressure across the conduit is the difference between the outlet pressure and the supply pressure, and is thus equal to the second pressure, and is thus appropriate;

wherein the waste water that is produced by the filtration unit is returned to the supply;

wherein water is conserved.

20. A water-saving method of conducting water purification by reverse osmosis, the method comprising:

receiving pressurized water from an upstream location of a supply of water;

elevating the pressure of the received supply water by a first amount suitable to appear as the differential pressure across a reverse osmosis unit plus a second amount suitable to force waste water of the reverse osmosis unit through a conduit;

wherein the elevated pressure of the supply water is inappropriately large so as to appear as the differential pressure across a reverse osmosis unit;

flow conducting the elevated-pressure water to an inlet port of the reverse osmosis unit; while simultaneously flow-conducting purified water from a first, purified water, outlet port of the reverse osmosis unit; while simultaneously flow-conducting waste water from a second, waste water, outlet port of the reverse osmosis unit directly to a downstream location of the supply of pressurized water without any substantial flow restriction;

wherein the waste water flow-conducted from the second port of the reverse osmosis unit is suitably returned to the supply of pressurized water because it is, even after a differential pressure drop equal to the first amount is incurred by the elevated-pressure water received at the inlet port of the reverse osmosis unit, the waste water at the second outlet port is still at a higher pressure than is the supply water.

21. A water purification system for connection to, and use between, each of an upstream and a downstream location of a municipal water supply providing water at a greater-than-atmospheric supply pressure, the system comprising:

a pump means, receiving water at the greater-than-atmospheric supply pressure from the upstream location of the municipal water supply, for boosting the pressure of the received water above the supply pressure to which it is already pressurized by an amount equal to the sum of (i) a relatively larger, first, pressure that is of a magnitude appropriate to serve as a differential pressure between an inlet and any outlet of a reverse osmosis unit, plus (ii) a relatively smaller, second, pressure that is of a magnitude suitable to serve as a differential pressure causative of a flow of fluid within a conduit;

wherein the pump means produces water at a boosted supply pressure;

a reverse osmosis unit, receiving at its inlet water at the boosted supply pressure from the pump means, for processing by reverse osmosis the received water while incurring a pressure drop equal to the first pressure so as to produce from the received water both (i) purified water at a one, first, outlet and (ii) waste water at another, second, outlet;

wherein the waste water at the second outlet of the reverse osmosis unit, in particular, is, despite the pressure drop equal to the first pressure between the inlet and the outlets of the reverse osmosis unit, still at a second outlet pressure that equals the sum of the supply pressure plus the second pressure, and which second outlet pressure is thus greater than the supply pressure; and a conduit means for conveying directly, and without any substantial flow restriction, the waste water at the second outlet pressure from the second outlet of the reverse osmosis unit to the downstream location of the municipal water supply in response to a pressure differential that is equal to the second pressure therebetween;

wherein the differential water pressure across the reverse osmosis unit between its inlet and its second outlet equals the first pressure, and is thus of a suitable magnitude;

wherein the waste water that is produced by the reverse osmosis unit is returned to the municipal water supply under the differential pressure equal to the second pressure despite the fact that the water supply is at a greater-than-atmospheric pressure;

wherein water is conserved.

* * * * *